(12) United States Patent
Koren

(10) Patent No.: US 10,377,063 B1
(45) Date of Patent: Aug. 13, 2019

(54) PRODUCTION LINE FOR MANUFACTURING MOLDED COLUMNS

(71) Applicant: Digger Specialties, Inc., Bremen, IN (US)

(72) Inventor: Robert Douglas Koren, Cary, NC (US)

(73) Assignee: Digger Specialties, Inc., Bremen, IN (US)

( * ) Notice: Subject to any disclaimer, the term of this patent is extended or adjusted under 35 U.S.C. 154(b) by 229 days.

(21) Appl. No.: 15/366,029

(22) Filed: Dec. 1, 2016

Related U.S. Application Data

(63) Continuation-in-part of application No. 14/991,137, filed on Jan. 8, 2016.

(60) Provisional application No. 62/261,358, filed on Dec. 1, 2015, provisional application No. 62/101,693, filed on Jan. 9, 2015.

(51) Int. Cl.
| | |
|---|---|
| *B29C 41/38* | (2006.01) |
| *B29C 41/04* | (2006.01) |
| *B29C 41/42* | (2006.01) |
| *B29K 67/00* | (2006.01) |
| *B29L 23/00* | (2006.01) |

(52) U.S. Cl.
CPC ............ *B29C 41/38* (2013.01); *B29C 41/042* (2013.01); *B29C 41/42* (2013.01); *B29K 2067/00* (2013.01); *B29L 2023/22* (2013.01)

(58) Field of Classification Search
None
See application file for complete search history.

(56) References Cited

U.S. PATENT DOCUMENTS 5,858,294 A   1/1999   Del Valle et al.

*Primary Examiner* — Monica A Huson
(74) *Attorney, Agent, or Firm* — Coats + Bennett, PLLC

(57) ABSTRACT

A production line for manufacturing molded columns comprises a plurality of molding machines, a carousel to convey the molding machines along a closed path, a pouring station disposed adjacent the closed path, and an unloading station disposed adjacent the closed path generally opposite the pouring station. A molding material is poured into molds in the molding machines as the molding machines are conveyed past the pouring station. The molding machines are actuated as the molding machines are being conveyed from the pouring station to the unloading station. At the unloading station, the molding machines are stopped and the molds are unloaded from the molding machines. The unloading station may include extraction equipment to extract the molded columns from the molds.

18 Claims, 22 Drawing Sheets

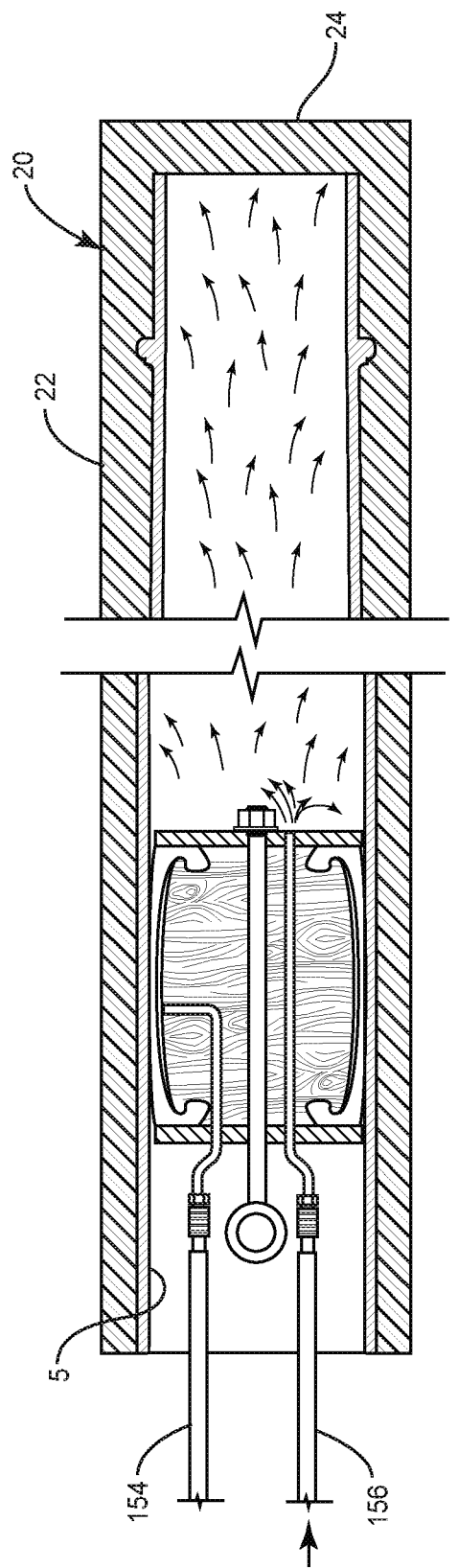

US 10,377,063 B1

PRODUCTION LINE FOR MANUFACTURING MOLDED COLUMNS

RELATED APPLICATIONS

This application claims the benefit of U.S. Provisional Application 62/261,358, filed Dec. 1, 2015. Additionally, this application is a continuation-in-part of prior U.S. application Ser. No. 14/991,137 filed 8 Jan. 2016 which claims the benefit of U.S. Provisional Application 62/101,693 filed 9 Jan. 2015 the disclosures of all of which are incorporated by reference herein in their entirety.

TECHNICAL FIELD

The present invention relates generally to molded columns and, more particularly, to methods and apparatus for manufacturing molded columns.

BACKGROUND

Columns are widely used in both residential and commercial buildings. Until recently, most columns used in residential construction have been made from wood. Molded columns, however, have some advantages over traditional wood columns and have been gaining in popularity. Some of the advantages of molded columns include lower costs, a wider variety of designs, and improved structural strength.

One technique for making molded columns is centrifugal molding. A viscous resin material is poured into an elongated mold having two parts. The mold is spun at high speed to force the molding material against the inner surface of the mold. When the molding material has set, the mold is opened and the column is removed. Typically, a two-part mold is used that leaves two longitudinally extending seam lines or ridges on the column where the mold separates. Therefore, the surface of the column needs to be sanded to remove the seam lines.

The conventional centrifugal molding process is labor intensive and consumes considerable space to manufacture enough components for commercial operations. Both of these factors increase the cost of manufacturing the columns. Therefore, there is a need for further improvements in the column manufacturing process to reduce the amount of labor and space needed for commercial production.

SUMMARY

The present invention relates generally to a production line for the manufacture of molded columns using a centrifugal or rotational molding process. The production line comprises a plurality of molding machines, a conveyor for conveying the molding machines along a closed path, a pouring station, and an unloading station. In one embodiment, the conveyor comprises a circular platform that rotates around a central axis and the molding devices are circumferentially spaced around the central axis of the carousel. Each molding machine includes a mold in which the columns are formed. At the loading station, a resinous molding material is poured into the mold. The molding machines are actuated to rotate the molds as the molding machines are being conveyed from the pouring station to the unloading station. At the unloading station, the molding machines are stopped and the molds are unloaded from the molding machines. The unloading station may include extraction equipment to extract the molded columns from the molds. The empty molds are then placed on a staging platform. After allowing sufficient time for the molds to cool, the molds are re-inserted into the molding machines before the molding machines reach the pouring station.

Although this disclosure focuses on the manufacture of molded columns, the techniques herein described are more generally applicable to any elongated molded part.

BRIEF DESCRIPTION OF THE DRAWINGS

FIGS. 10A-10G illustrate a method of using air pressure to extract a molded column from a mold.

DETAILED DESCRIPTION

Figure 1:
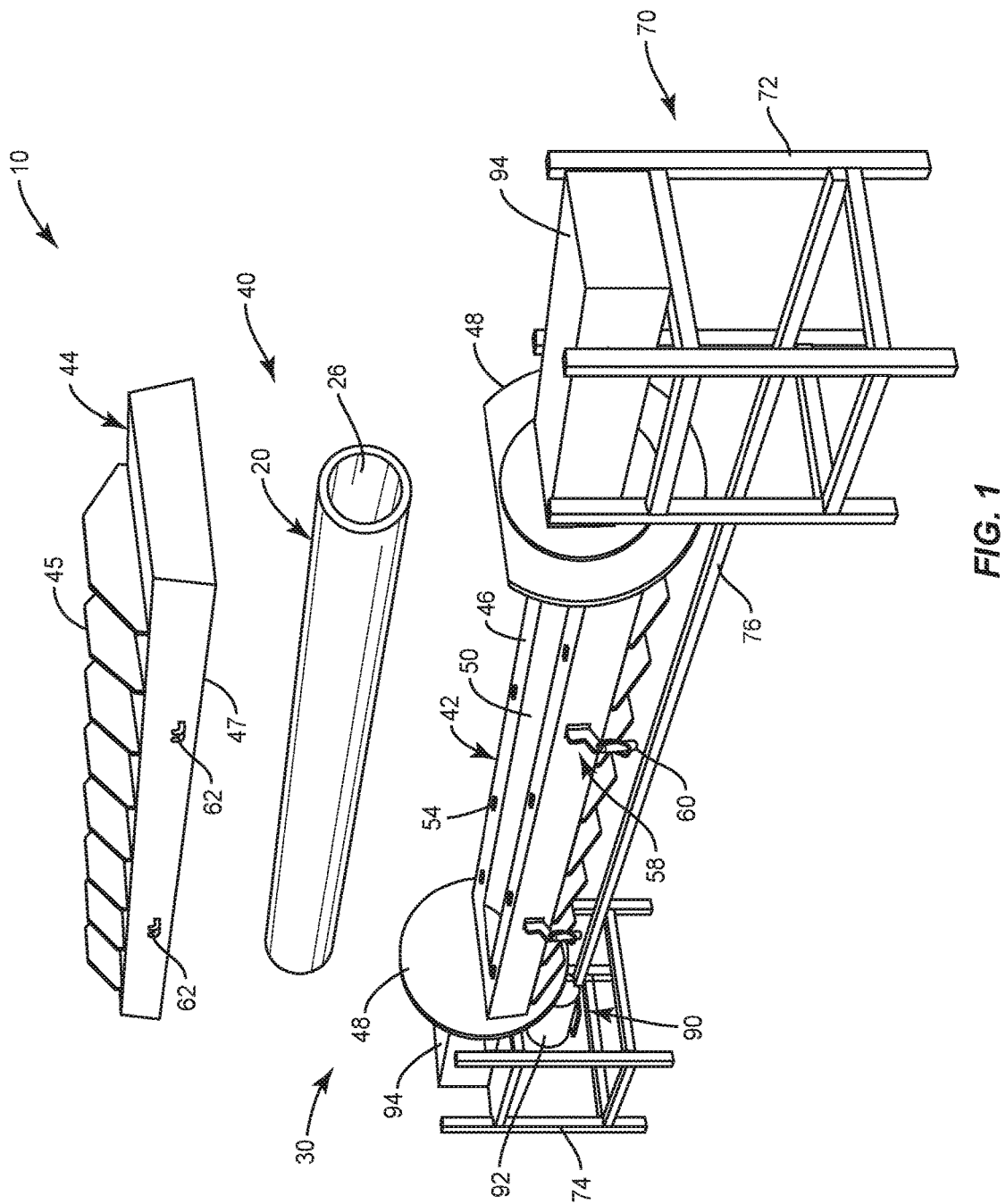
FIG. 1 is an exploded perspective view of a molding apparatus for molding columns including a mold and mold housing.

Referring now to the drawings, a molding apparatus 10 and extraction equipment 100 according to an exemplary embodiment of the disclosure is shown. The molding apparatus 10, in general, is used to mold a column from a suitable molding material by centrifugal or rotational molding. To briefly summarize, the molding material, such as a polyester resin, is poured into a mold 20. The molding material is initially in a viscous state, and subsequently hardens to form the molded part. In one embodiment, the molding material comprises a blend of polyester resin and powered marble containing approximately 25% to 35% polyester resin. The mold 20 is rotated by a spinning machine 30 so that the centrifugal force causes the molding material to flow against the inner surface of the mold 20. The mold 20 is rotated until the molding material has had sufficient time to set thus forming a column. Extraction equipment 100 is then used to extract the molded column from the mold.

As will be described in more detail below, the mold 20 is a single piece mold that is open at one end. The molded column is extracted by pulling the molded column axially through the open end of the mold 20. Single piece molds have not been used in the past because of the difficulty of extracting the molded part from the mold 20. If the molded column does not release from the inner surface of the mold 20, pulling the molded column through the mold 20 may mar the molded column and/or damage the mold 20. Another problem is that the molded columns may include features, such as rings, astragals or sculptural reliefs, that normally prevent the molded column from being extracted in an axial direction. This disclosure describes techniques for axially extracting a molded column or other elongate structure from a mold without marring the surface of the molded part or damaging the mold. The techniques herein described may be used even when the molded part includes rings, sculptural reliefs, or other profiles that would normally prevent axial extraction of the molded part from the mold 20.

FIG. 1 is an exploded perspective view of an exemplary molding apparatus 10 for making columns or other elongate members. The molding apparatus 10 generally comprises a mold 20 for forming the molded part and a spinning machine 30 for rotating the mold 20 while the molded part is being formed.

Figure 5:
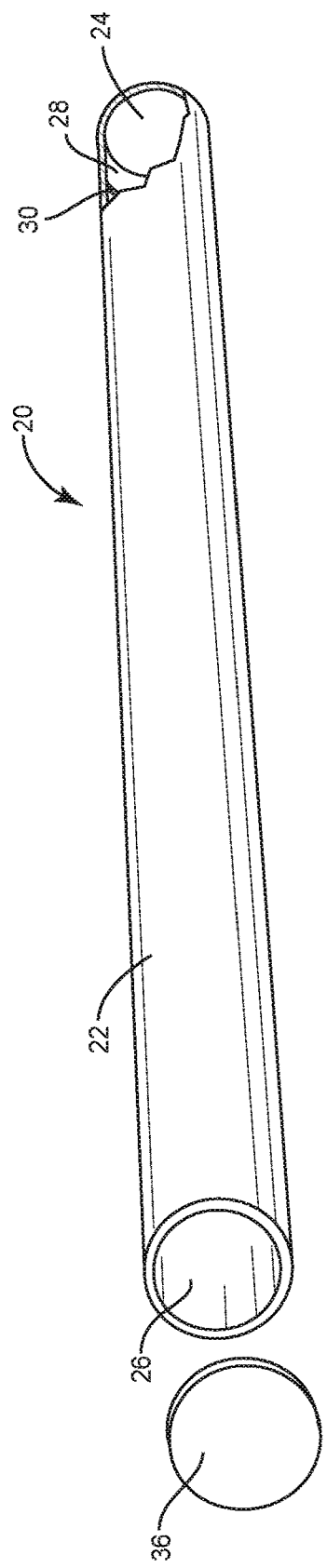
FIG. 5 is a perspective view of an exemplary mold and end cap for sealing the open end of the mold.

FIG. 5 illustrates an exemplary mold 20. The mold 20 comprises a flexible sidewall 22, a closed end 24 and an open end 26. The flexible sidewall 22 that is made of a resilient material, e.g., silicone rubber, that can radially expand and return to its original condition. The sidewall 22 of the mold is preferably made of a single piece and does not include a parting line. The sidewall 22 includes an inner surface 28 that conforms to the desired shape of the molded column. In this example, the inner surface 28 of the mold generally defines a generally circular cylinder that tapers outwardly from the upper end of the column to the lower end of the column. It will be appreciated, however, that the mold 20 may be designed to produce columns of virtually any geometric shape including square columns, rectangular columns, oval or elliptical columns, or hexagonal columns. The column may include recessed or protruding features such as flutes, rings, sculptural reliefs, or other molded profiles that extend out of or into the exterior surface of the column. Therefore, the inner surface 28 of the sidewall 22 may include a recessed or protruding form to mold a protruding or recessed feature or in an exterior surface of the column. In the exemplary embodiment shown in FIG. 5, the inner surface 28 of the mold 20 includes an annular channel 30 having the profile of a desired architectural molding for forming a ring or astragal that encircles or surrounds the exterior surface of the column.

The spinning machine 30, as previously described, rotates the mold 20 while the column or other molded part is being formed. The spinning machine 30 comprises a mold housing 40, support frame 70, and drive assembly 90. The mold 20 inserts into a cavity 50 in the mold housing 40. The mold housing 40 is rotatably mounted to the support frame 70. A drive assembly 90 including a drive motor 92 rotates mold housing 40 about a longitudinal axis that coincides with the center line of the mold 20. The rotation of the mold 20 within the mold housing 40 cause the material in the mold 20 to flow radially outward into contact with the inner surface 28 of the sidewall 22. The rotation of the mold 20 continues until the molding material sets.

The mold housing 40 is illustrated in FIGS. 1-4. The mold housing 40 includes a first housing section 42 and second housing section 44 which may be separated. The first and second housing sections 42, 44 comprise box-like casings made of wood, metal fiberglass or other suitable material that are filled with epoxy. Stiffening members 45 are affixed to outer surface of the housing sections 42, 44 to impart strength and rigidity to the housing section 42, 44. The first and second housing sections 42, 44 include flat mating surfaces 46 and 47 formed by the epoxy filling. The epoxy filling in the first and second housing sections 42, 44 define a cavity 50 configured to receive the mold 20. The cross-section of the cavity 50 when the mold housing 40 is assembled conforms to the exterior cross-section of the mold 20. The cavity 50 is long enough to receive the mold 20 with a small gap between the open end 26 of the mold 20 and the end of the cavity 50 to receive an end cap 36 (FIG. 5) used to close the open end 26 of the mold 20 during the molding process.

In some embodiments, the mating surfaces 46, 47 of the first and second housing sections 42, 44 may include complimentary locating features 54 for aligning the first and second housing sections 42, 44. The first and second housing sections 42,44 are secured together by latches 58. The type of latch is not a material aspect of the mold housing 40. For example, the latches 58 may comprise conventional draw latches including a first latch part including a loop 60 that engages with a second latch part including a hook 62.

The mold housing 40 includes mounting plates 48 attached at each end of the first housing section 42. A mounting shaft 52 extends from each mounting plate 48 along the longitudinal centering of the mold housing 40 for rotatably mounting the mold housing 40 to a support frame 70.

The support frame 70 includes first and second frame sections 72, 74 disposed at opposite ends of the mold housing 40. The first and second frame sections 72, 74 may be interconnected by connecting members 76. In one exemplary embodiment, the first and second frame sections 72, 74 include pillow bearings 78 (FIG. 6) shielded by an enclosure to receive the mounting shafts 52 extending from opposite ends of the mold housing 40.

Figure 6:
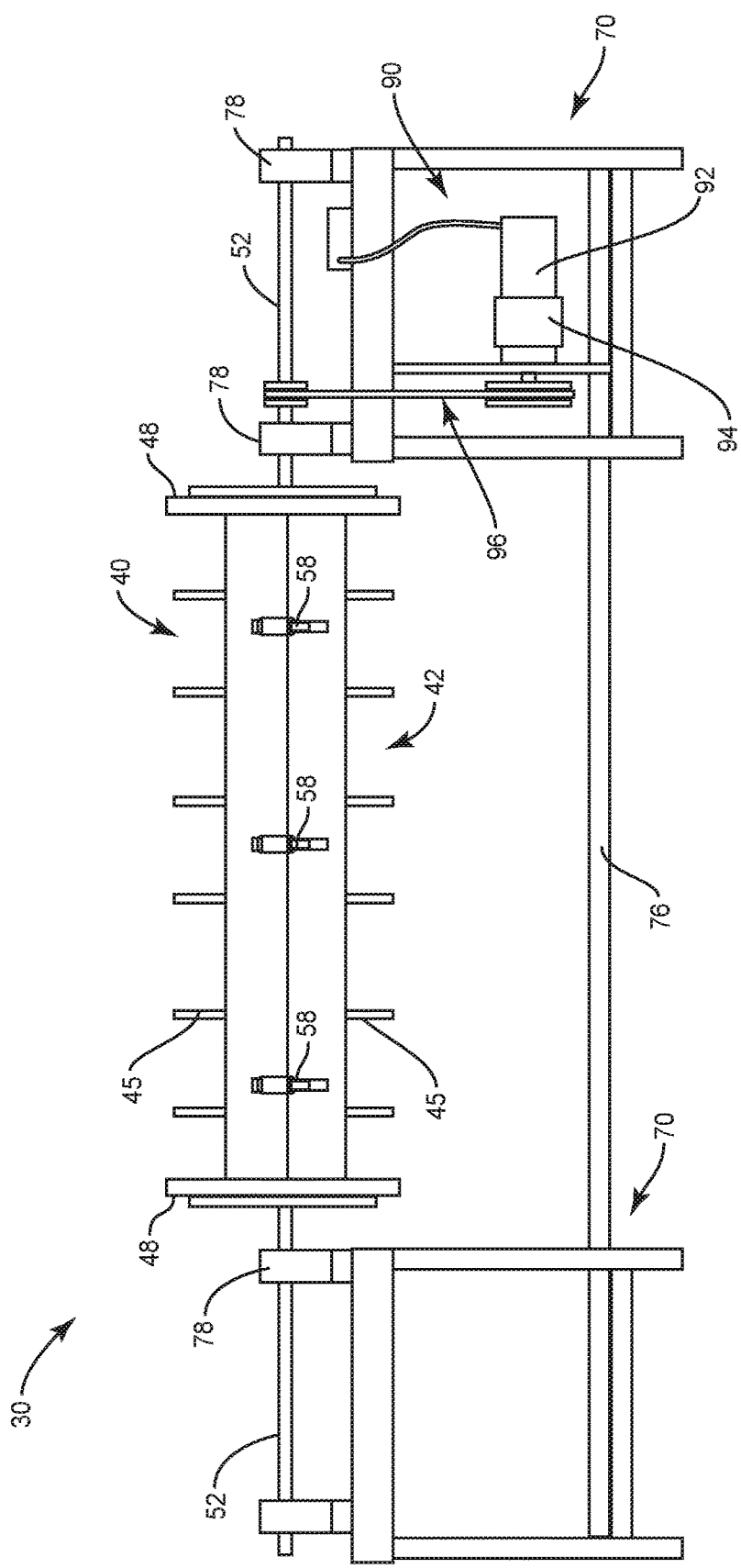
FIG. 6 illustrates a spinning apparatus for rotating the mold.

A drive assembly 90 including a motor 92 is provided for rotating the mold housing 40. In some embodiments, a direct drive arrangement may be used wherein the motor 92 is directly coupled to one of the mounting shafts 52 and rotates the mold housing 40. In one embodiment, a gearbox 94 and drive pulley arrangement 96 may be interconnected between the drive motor 92 and mounting shaft 52 at one end of the mold housing 40 as shown in FIG. 6. The particular arrangement of the drive assembly 90 is not a material aspect of the disclosure. In the embodiment shown in FIG. 6, a drive pulley is mounted to the output shaft of gearbox 94 and is connected by a belt to a driven pulley on one of the mounting shafts 52.

Figure 2:
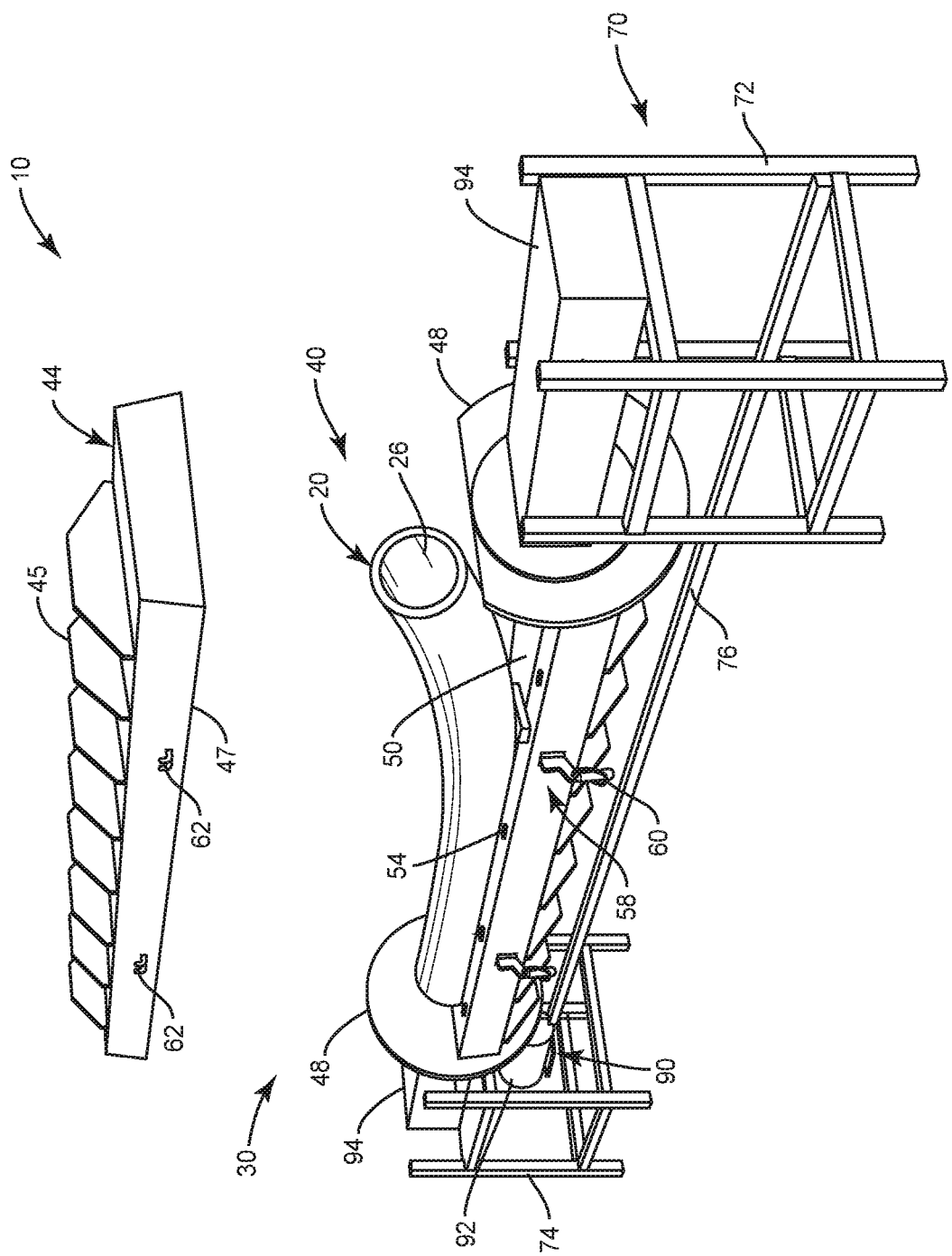
FIG. 2 is a perspective view of the molding apparatus with the mold inserted into an open mold housing and open end of the mold raised to allow introduction of molding material into the mold.
Figure 3:
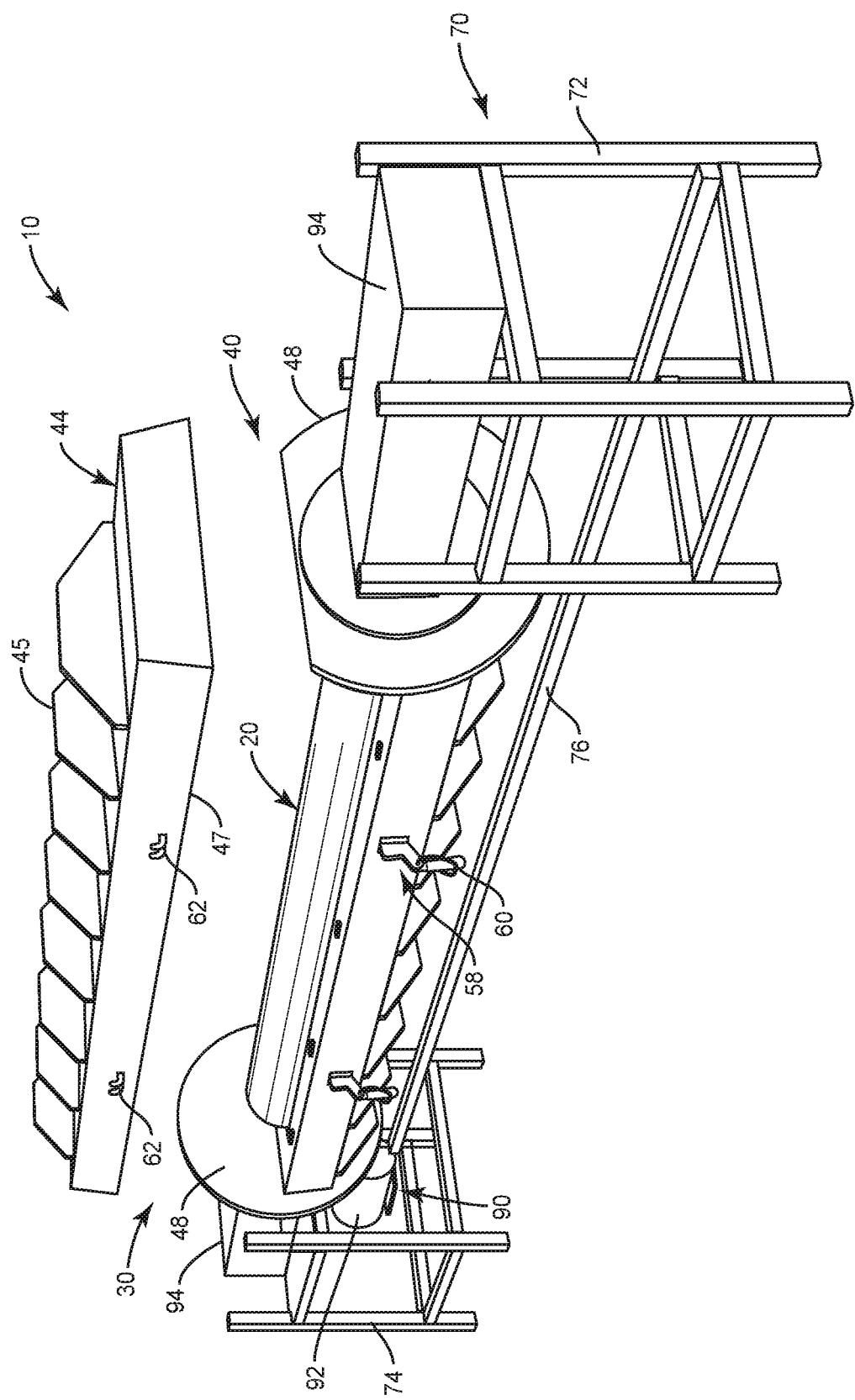
FIG. 3 is a perspective view of the molding apparatus with the mold inserted into the open mold housing.
Figure 4:
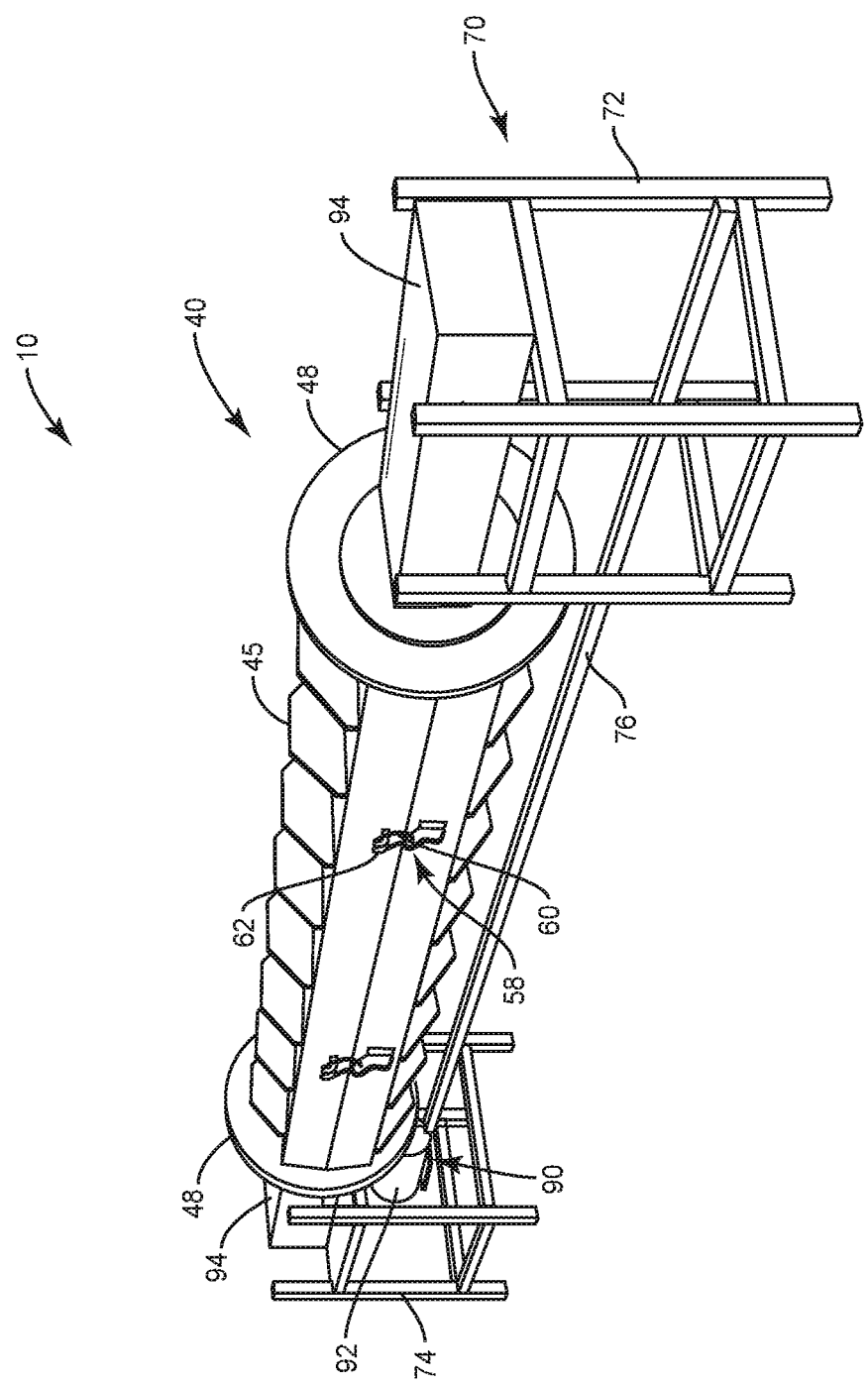
FIG. 4 is a perspective view of the molding apparatus with the mold housing closed.

FIGS. 2-4 illustrate an exemplary process for making a molded column using the molding apparatus 10. The mold 20 is inserted into the mold cavity 50 and the open end 26 of the mold 20 is elevated. A block may be inserted beneath the mold 20 as shown in FIG. 2 to help hold the open end 26 of the mold 20 in an elevated position. A molding material is poured into the open end 26 of the mold 20. Once the molding material is poured into the mold 20, the open end 26 is lowered into the mold cavity 52 of the second housing section 44 and the end cap 36 is inserted between the open end 26 of the mold 20 and the end wall of the cavity 50 to seal the mold 20. The second housing section 44 is then lowered onto the first housing section 42 and the latches 58 are engaged to secure the first and second housing sections 42, 44 together.

The mold housing 44 and mold 20 are then rotated for a predetermined period of time depending upon the properties of the molding material. In general, the mold housing 40 and mold 20 are rotated for a sufficient amount of time to allow the molding material to set and form the molded column. When the mold 20 is rotated, the material inside the mold 20 flows outward against the inner surface 28 of the mold 20. Once the molding material has had sufficient time to set, the rotation of the mold 20 is stopped and the mold 20 is removed from the mold housing 40. The extraction equipment 100 is then used to extract the molded column from the mold 20.

Figure 7:
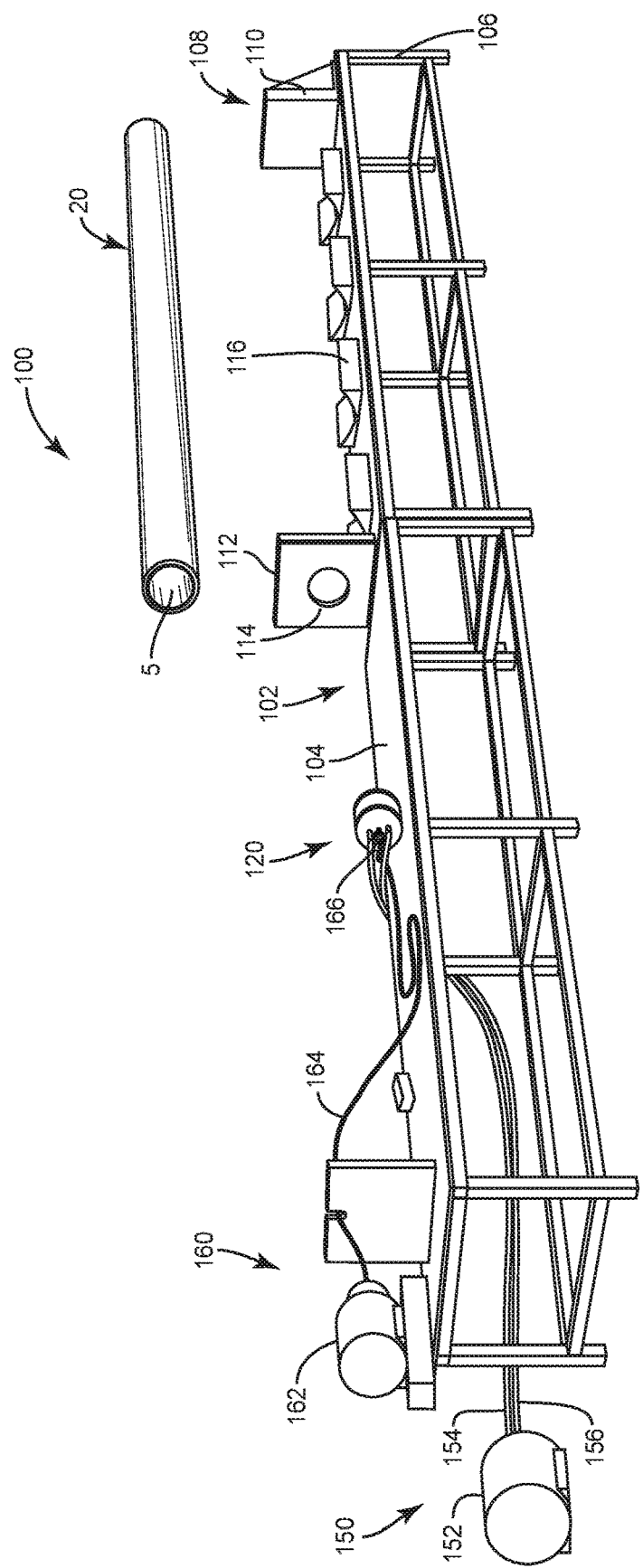
FIG. 7 is a perspective view of an apparatus for extracting molded columns from molds.

FIG. 7 illustrates the extraction equipment 100 used to extract the molded column from the mold 20. The extraction equipment 100 generally comprises a work table 102, a holding fixture 108, disposed on the work table 102, an expandable plug 120 for insertion into the molded column, an air supply system 150 for supplying air to the interior of the molded column, and a pulling device 160 for pulling the molded column from the mold 20.

The work table 102 comprises an elongated work surface 104 that is supported by a support frame 106. The holding fixture 108 is disposed at one end of the work surface 104. The holding fixture 108 comprises end plates 110,112 and one or more column supports 116. When the mold 20 is inserted into the holding fixture 108, the closed end of the mold is placed against the end plate 110 while the open end 26 of the mold 20 is disposed towards end plate 112. End plate 112 includes an opening 114 that is large enough for the molded column to pass through. The column supports 116 include arcuate support surfaces that generally conform to the shape of the mold 20. When the mold 20 is placed in the holding fixture 108, the column supports 116 supports the mold 20 so that the mold 20 is actually aligned with the opening 114 in the end plate 112.

Figure 8A:
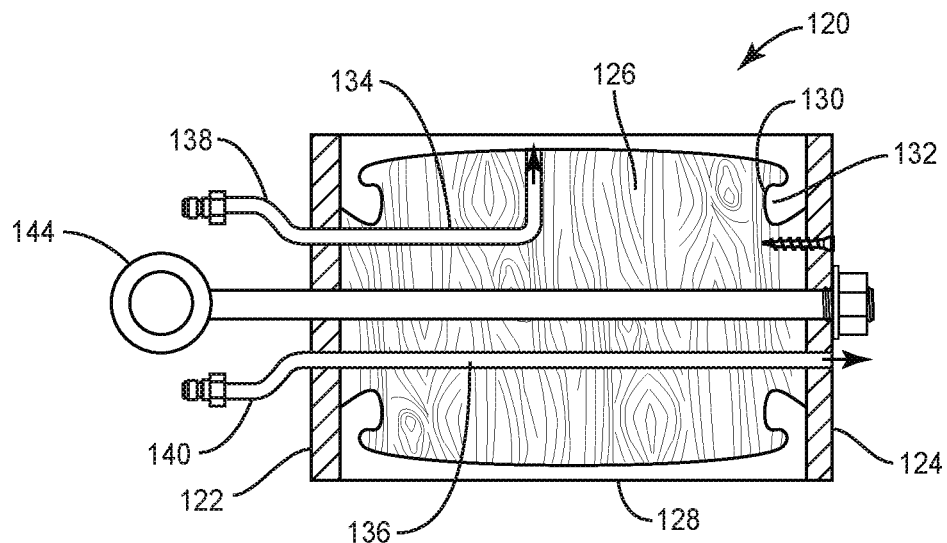
FIGS. 8A and 8B illustrate an expandable plug.
Figure 8B:
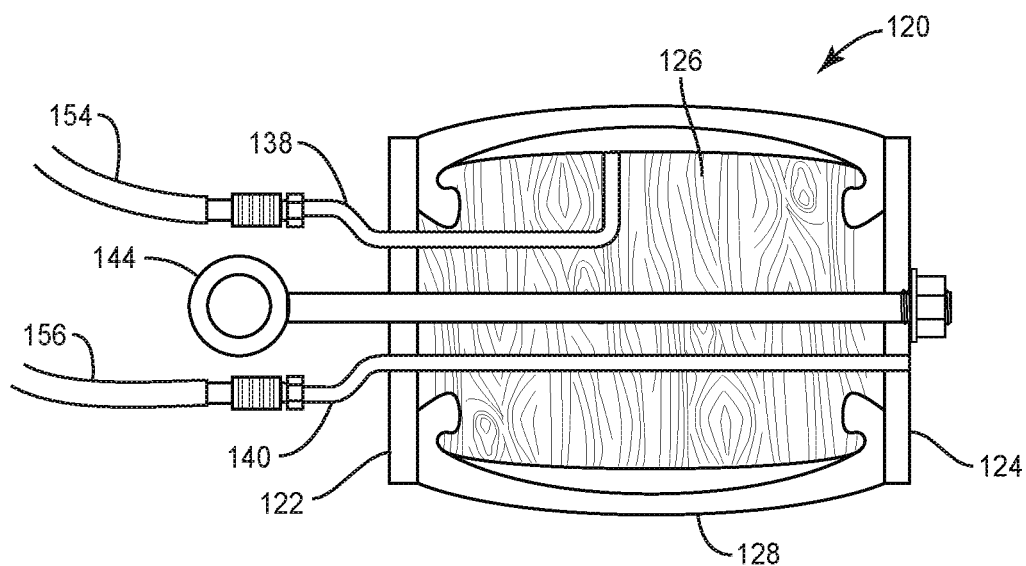

The expandable plug 120, shown in FIGS. 8A and 8B, is configured to be inserted through opening 114 in end plate 112 and the open end 26 of the mold 20 into the interior of the molded column. The expandable plug 120 includes an outer plate 122, inner plate 124, core member 126, and flexible side wall 128. The outer plate 122 and inner plate 124 are secured to the core member 126 by crews, bolts or other suitable fasteners. The sidewall 128 surrounds the core member 126. The core member 126 includes channels 130 that interlock with protrusions 132 at the ends of the sidewall 128 to hold the sidewall 128 in place. A first air passage 134 in the core member 126 communicates with the space between the core member 126 and sidewall 128. A second air passage 136 extends through the end plate 122, core member 126 and end plate 124 to communicate with the interior of the molded column. The first and second air passages 134,136 connect to inlet tubes 138,140 with quick connect couplings for coupling the inlet tubes 138,140 to air supply lines 154,156 as hereinafter described. An eyelet 144 is secured to the core member 126. As will be described in more detail below, the eyelet 144 is used to pull the molded column from the mold 20.

Referring back to FIG. 7, the air supply system 150 comprises an air compressor 152 and air supply lines 154,156. The air compressor 152 serves as a source of pressurized gas and may comprise at least two outlets that provide air at different pressures. Alternatively, the source of pressurized gas may comprise two separate air compressors, each providing air at a different pressure. A first air supply line 154 connects to a first outlet of the air compressor 152 to the first inlet tube 138 of the expandable plug 120. A second air supply line 156 connects a second outlet of the air compressor 152 to the second air tube 140 of the expandable plug 120. As will be described in more detail below, the air pressure applied via the first air supply line 154 to the interior of the expandable plug is greater than the air pressure supplied by air supply line 156 to the interior of the molded column.

Figure 9A:
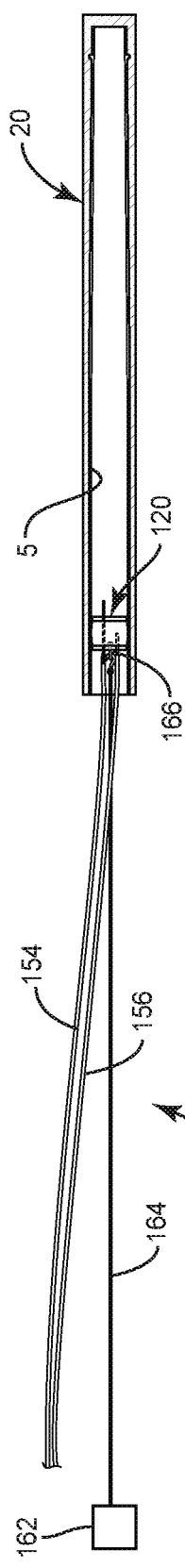
FIGS. 9A-9C are schematic diagrams illustrating the basic process of extracting a molded column from a mold.
Figure 9B:
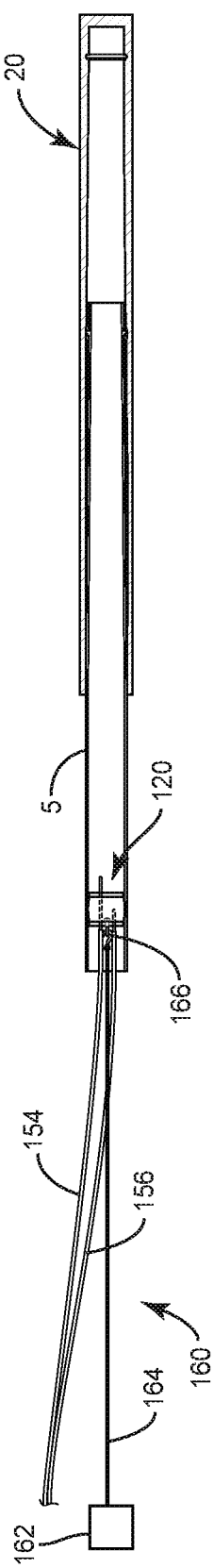
Figure 9C:
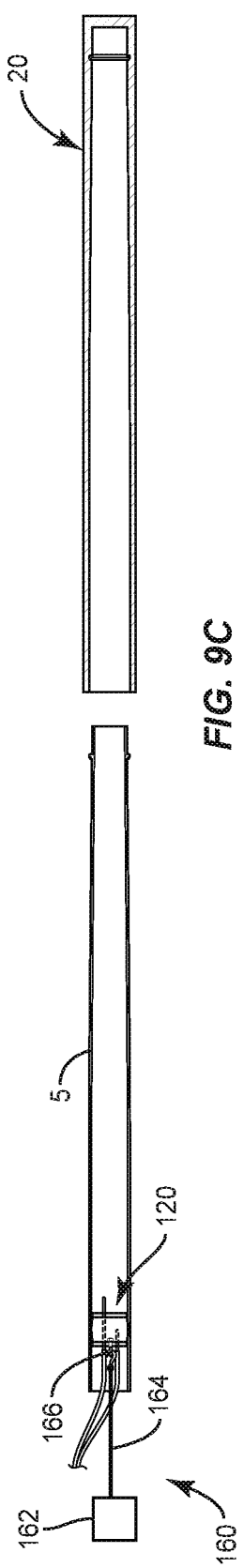

The pulling device 160, shown in FIGS. 9A-9C, comprises a winch 162 and cable 164. A hook 166 is disposed at the free end of the cable 164. The hook 166 is configured to engage with the eyelet 144 on the expandable plug 120. When the winch 162 is actuated, the cable 164 and hook 166 apply an axial force to the expandable plug 120 to pull the molded column out through the open end 26 of the mold.

FIGS. 9A-9C schematically illustrates the process for extracting the molded column from the mold 20. FIG. 9A shows the expandable plug 120 inserted into the molded column through the open end 26 of the mold 20. Air supply lines 154 and 156 are connected respectively to the first and second air tubes 138,140 respectively. The cable 164 of the winch 162 is engaged with the eyelet 144 on the expandable plug 120. Air pressure in the range of about 12-15 psi is applied via the first air supply line 154 to the interior of the expandable plug 120 causing the sidewall 128 of the expandable plug 120 to expand radially outward and engage the inner surface of the molded column. The engagement of the sidewall 128 of the expandable plug 120 with the inner surface of the molded column also seals one end of the molded column. Air pressure in the range of about 6-10 psi is then applied via the second air supply line 156 to the interior of the molded column. As will be described in more detail below, the air pressure supplied to the interior of the molded column causes the mold 20 to expand and release from the molded column so that the molded column can be pulled through the open end 26 of the mold 20. In FIG. 9B, the winch 162 is actuated while air is applied to the interior of the column to pull the molded column through the open end 26 of the mold 20. FIG. 9C shows the column fully extracted from the mold 20.

Figure 10A:
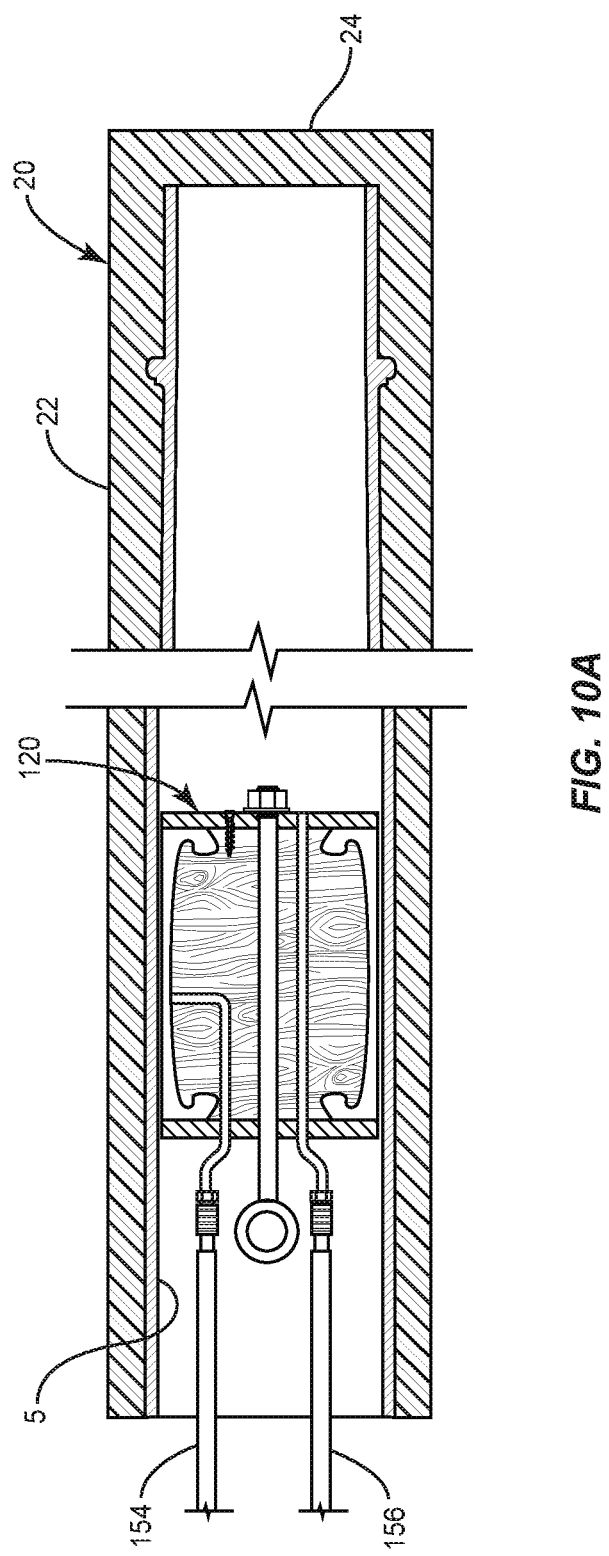
Figure 10B:
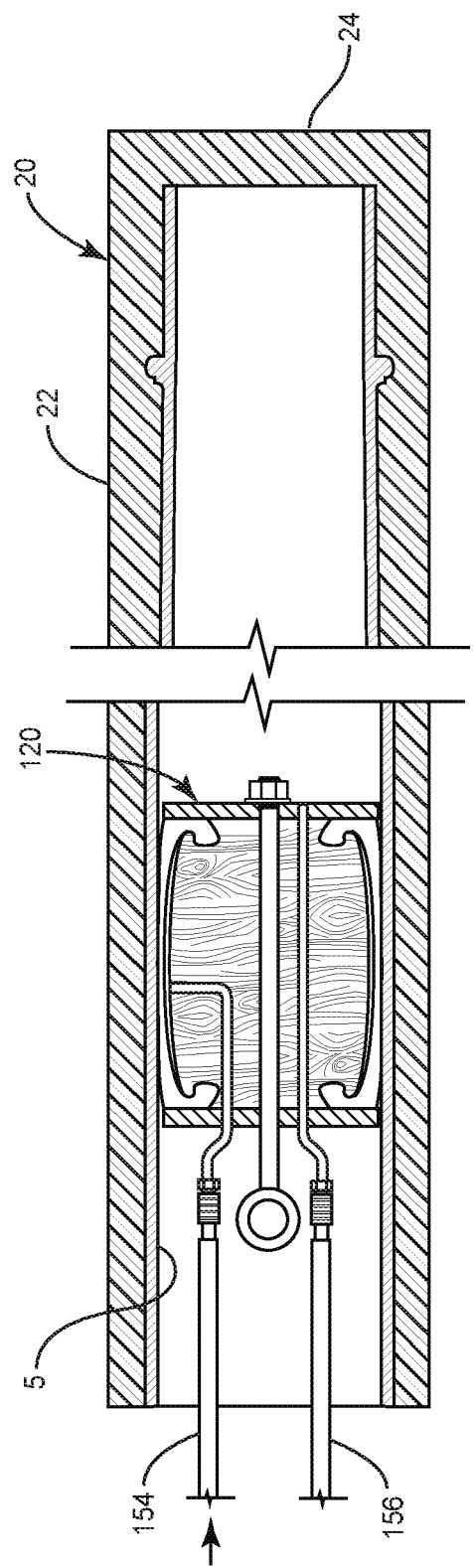
Figure 10D:
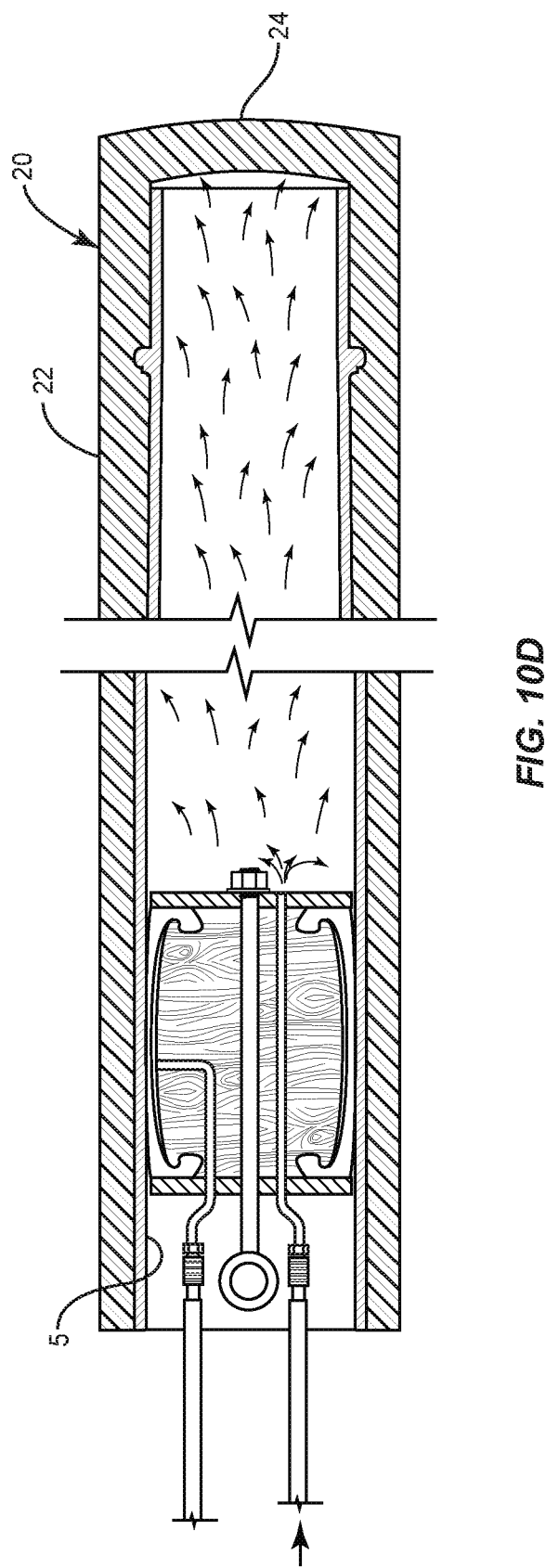
Figure 10E:
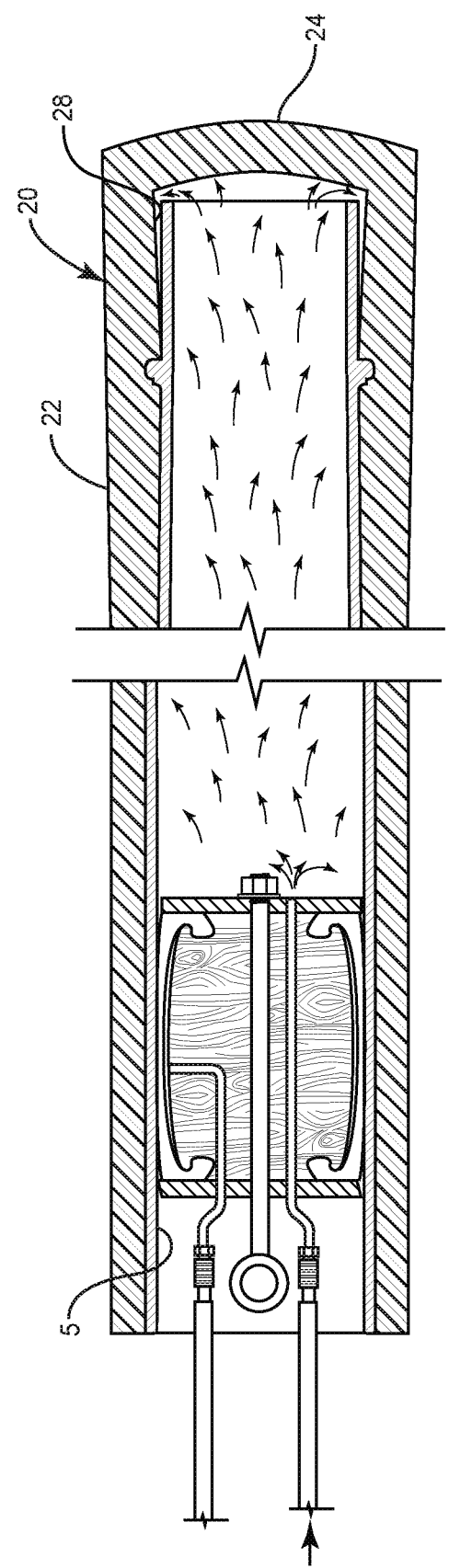
Figure 10F:
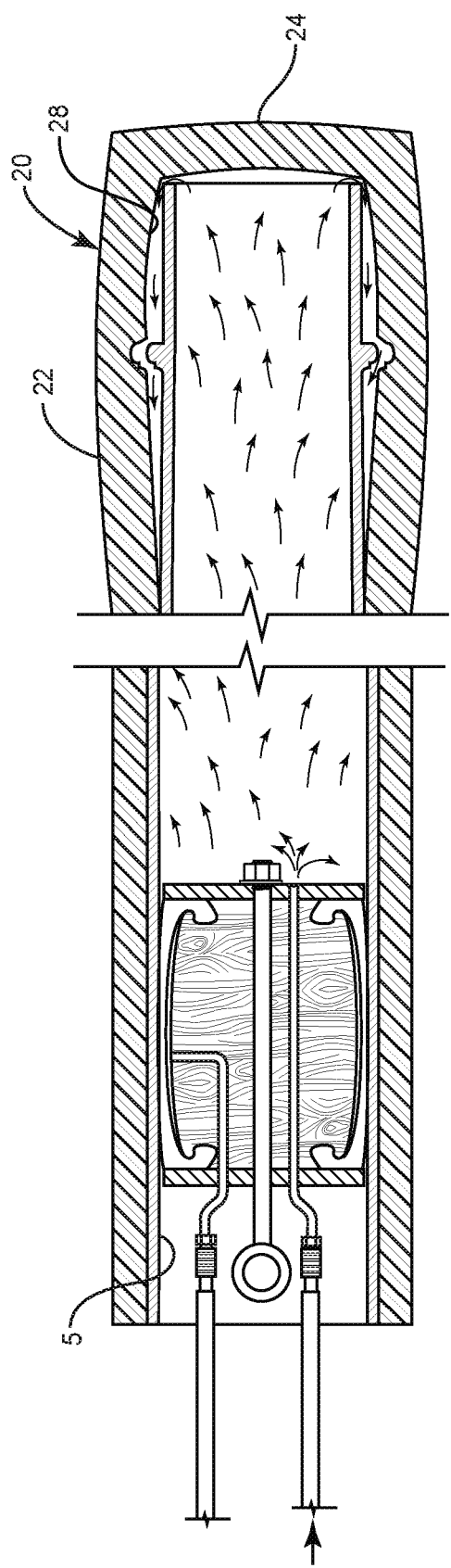
Figure 10G:
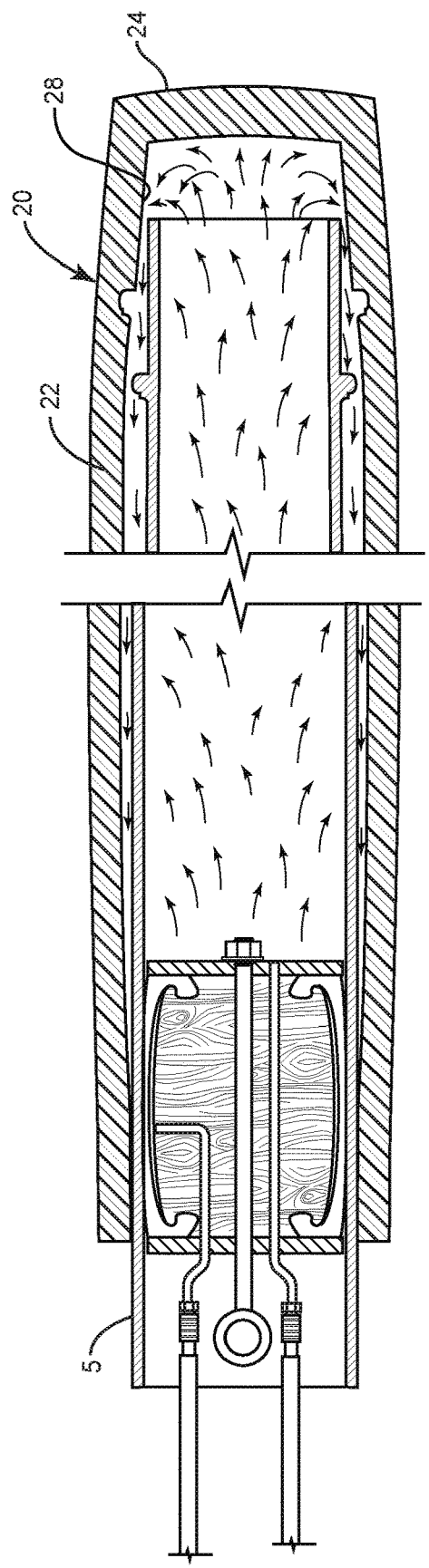

FIGS. 10A-10G illustrate in more detail how air pressure supplied to the interior of the molded column facilitates extraction of the molded column from the mold 20. FIG. 10A shows the expandable plug 120 inserted into the interior of the molded column. In FIG. 10B, air pressure is supplied via air supply line 154 to the interior of the expandable plug 120. The air pressure inside the expandable plug 120 causes the sidewall 128 of the expandable plug 120 to radially expand into engagement with the inner surface of the molded column. Once the expandable plug 120 expands into engagement with the inner surface of the molded column, air pressure is supplied via the second air supply line 156 to the interior of the molded column as shown in FIG. 10C. As shown in FIG. 10D, the air pressure inside the molded column initially causes the closed end 24 of the mold 20 to bulge outward. The air then infiltrates between the exterior surface of the molded column and the inner surface 28 of the mold 20 as shown in FIG. 10E. The infiltration of air between the exterior surface of the molded column and inner surface 28 of the mold 20 causes the sidewall 22 of the mold 20 to expand radially outward and separate or release from the molded column as shown in FIGS. 10F and 10G. In other words, the air infiltrating between the exterior surface of the molded column and inner surface 28 of the mold 20 breaks the mold 20 free from the molded column. The molded column may then be pulled axially through the open end 26 of the mold 20.

When the mold is properly inflated, the mold 20 will separate from the exterior surface of the molded column allowing the winch 162 to easily remove the molded column from the mold 20. If the winch 162 is actuated too early, unnecessary stress may be exerted on the mold 20 and the expandable plug 120. One issue is that pulling on the expandable plug 120 before the mold 20 releases from the exterior surface of the molded column generates a shear which could damage the molded column or the mold 20. Further, if the pulling force is applied before the molded column is released from the inner surface of the mold 20, the winch 162 is pulling not just the molded column but is also compressing the end of the mold 20 against the plate 112. When the molded column finally releases with the inner surface 28 of the mold 20, the molded part will suddenly lurch forward. Excessive shear forces may also cause damage to the expandable plug 120.

Figure 11A:
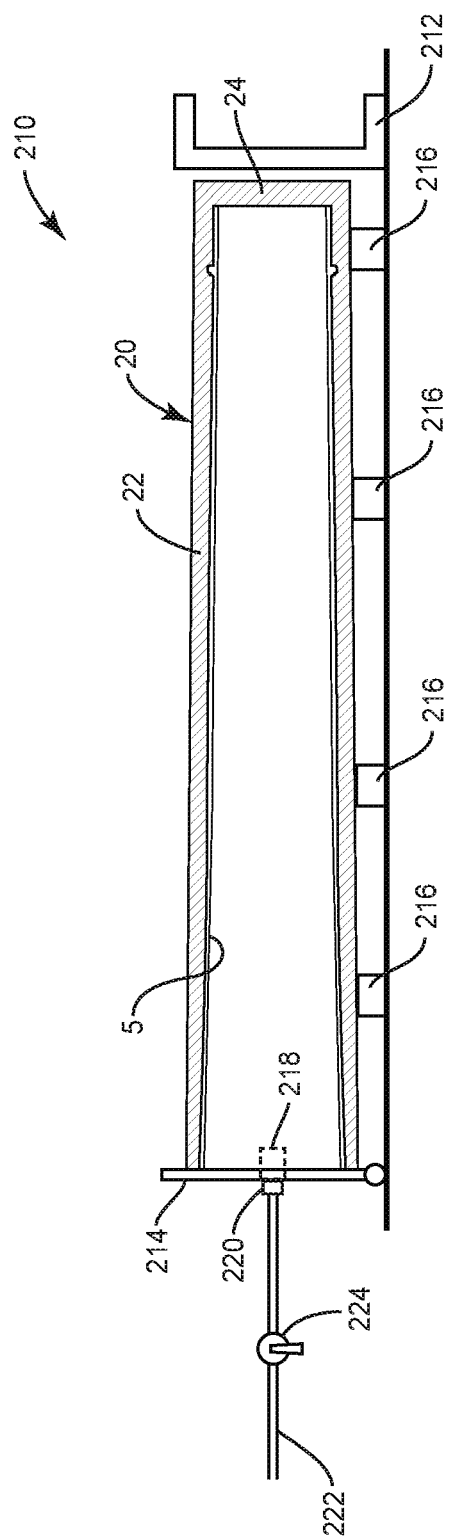
FIGS. 11A-11C illustrate an apparatus for releasing a mold from a molded column.
Figure 11B:
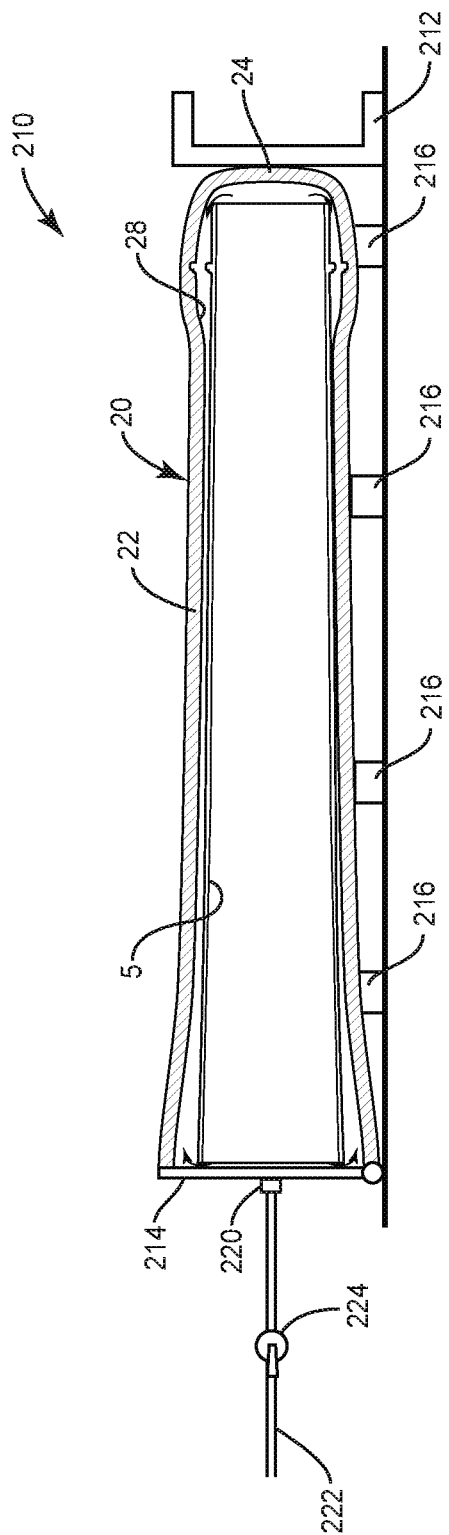
Figure 11C:
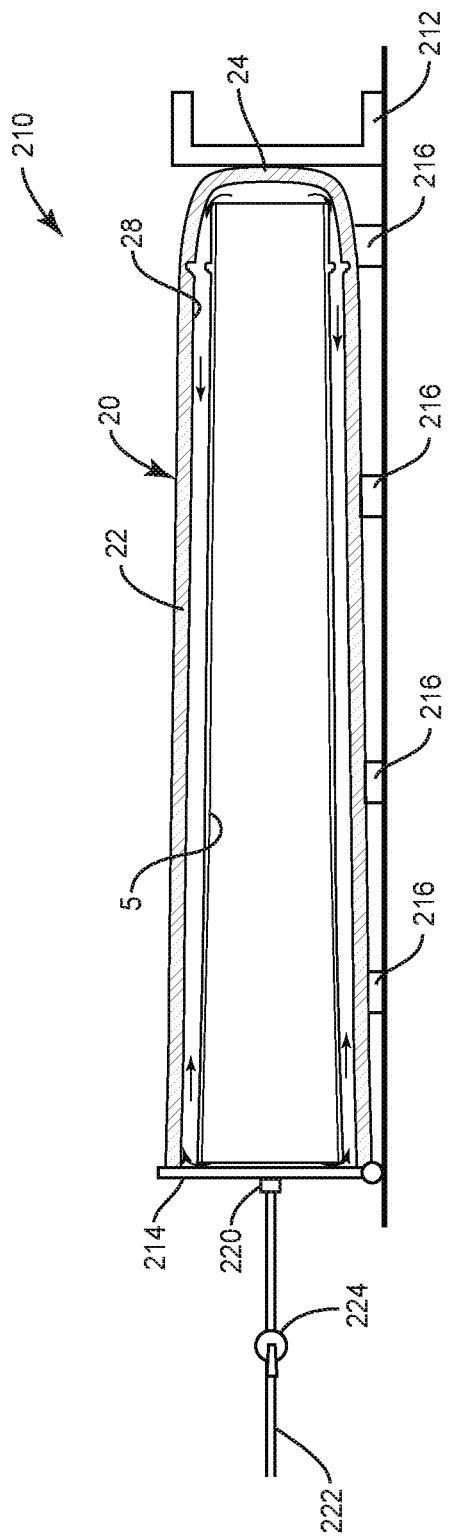

In order to avoid such issues, a separate mold inflation step may be performed prior to the extraction step. FIGS. 11A-11C illustrates an exemplary inflation step. This inflation step may be performed at the same station where the mold 20 is extracted, or at a separate work station. As shown in FIG. 11A, the mold 20 with the molded column formed therein is inserted into a holding fixture 210. The holding fixture 210 includes a backstop 212 and a seal plate 214. The seal plate 214 is pressed against the open end 26 of the mold 20. An air tube 218 including a coupling connects to an air supply line 220 to supply air to the interior of the molded column. The air supply line may include a valve 224 for opening and closing the air supply line. When the valve 224 is open, air is applied to the interior of the molded column. In a manner similar to that shown in FIGS. 10A-10F, the air flows around the ends of the molded column and infiltrates the space between the exterior surface of the molded column and inner surface 28 of the mold 20 as shown in FIG. 11B. The air infiltration causes the sidewall 22 of the mold 20 to expand radially outward so that the inner surface 28 of the mold 20 releases from the exterior surface of the molded column as shown in FIG. 11O. After the mold 20 is released from the exterior surface of the molded column, the mold 20 may be inserted into the extraction equipment 100 and the molded column may be extracted as previously described.

Figure 12:
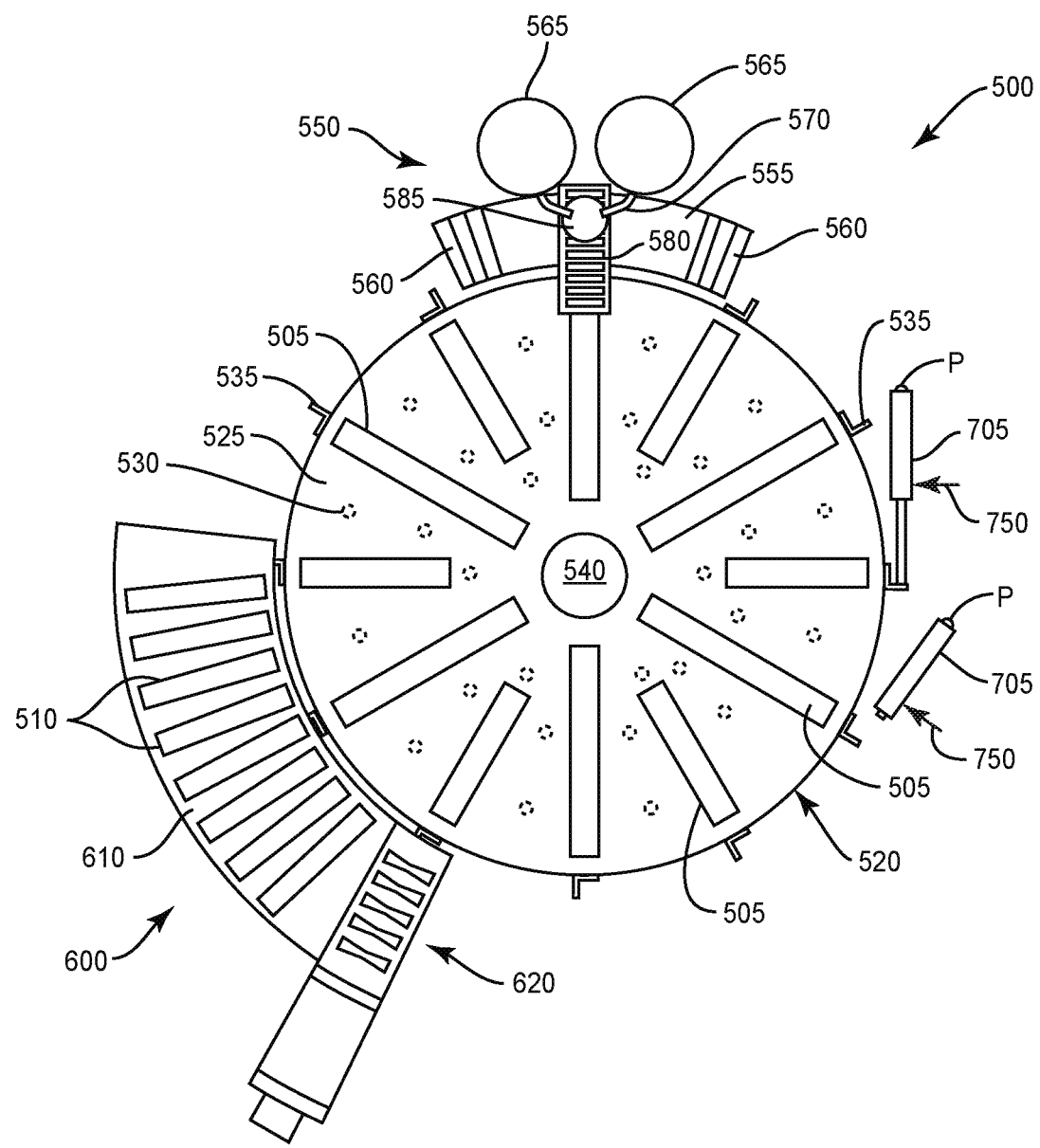
FIG. 12 is a schematic diagram illustrating a production line including a carousel for molding columns.

FIG. 12 illustrates a production line 500 for manufacturing columns using a centrifugal or rotational molding process. The production line 500 comprises a plurality of molding machines 505, a carousel 520 or other conveyor for conveying the molding machines 505 in a closed path, a pouring station 550, and an unloading station 600. Each molding machine 505 is configured to receive a mold 510 for forming columns. The molding machine 505 and mold 510 for the production line 500 may be similar to the molding apparatus 10 and mold 20 shown in FIGS. 1-7, although the production line 500 could also be used with conventional molding machines with two-part molds.

Carousel 520 is configured to convey the molding machines 505 along a closed path. In one embodiment, the carousel 520 rotates about a central axis and conveys the molding machines 505 in a circular path. The pouring station 550 is disposed adjacent the closed path for supplying a molding material to the molds 510 in the molding machines 505 as the molding machines 505 are conveyed past the pouring station 550. The unloading station 600 is disposed adjacent the closed path generally opposite the pouring station 550. The unloading station 600 is configured for unloading the molds from the molding machines 505 as the molding machines 505 are conveyed past the unloading station 600.

The carousel 520 in the embodiment shown herein comprises a rotating platform 525 that rotates about a central axis. Casters or wheels 530 are secured to the bottom surface of the platform 525 and roll on a flat concrete slab or other support surface. A utility column 540 extends upwardly through an opening in the center of the rotating platform 525 and is journaled in a bearing (not shown) so that the column 540 is stationary. The utility column 540 contains the electrical service and other utilities needed for operation.

In one embodiment, the carousel 520 is rotated incrementally from one index position to another by a hydraulic drive system 700. In other embodiments, the carousel 520 may be rotated in a continuous fashion. Those skilled in the art will appreciate that other drive arrangements may be used to rotate the platform 525. For example, an electric or hydraulic drive motor could directly drive the platform 525. Alternatively, a drive motor could be connected to the platform 525 by a drive belt, drive chain, or drive shaft. The details of the drive arrangement are not a material aspect of the production line.

Figure 13:
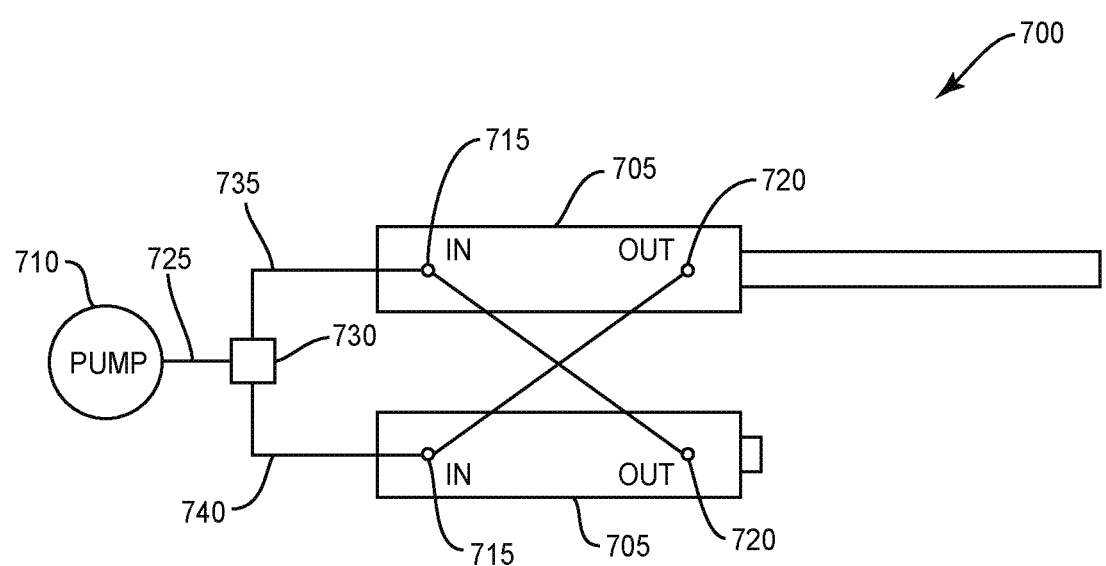
FIG. 13 illustrates an exemplary drive arrangement for the carousel.

FIG. 13 illustrates an exemplary hydraulic drive system 700 for rotating the carousel 520 in one exemplary embodiment. The hydraulic system 700 is designed to rotate the platform 525 incrementally rather than continuously. The drive system 700 comprises a pair of double-acting hydraulic cylinders 705 operatively connected to a hydraulic pump 710. The hydraulic cylinders 705 are pivotally connected at one end to a pivot P and have a piston rod that engages the outer periphery of the carousel 520. A biasing mechanism 750 (represented schematically by the arrows in FIG. 12) biases the piston rod of the cylinders 705 into contact with the outer periphery of the carousel 520. The biasing mechanism may, for example, comprise a cylinder or spring. The piston rods of the hydraulic cylinders 705 engage push plates 535 attached to the periphery of the carousel 520 one at a time to rotate the carousel 520 incrementally from one index position to another. As the piston rod of one cylinder 705 is extending to push the carousel 510, the piston rod of the other cylinder 705 is retracting. The terminal end of the piston rod of the retracting cylinder 705 rides along the outer periphery of the carousel 520 and passes over one of the push plates 535 so that the push plate 535 will be in position to be pushed by the hydraulic cylinder 705 during the next cycle. The push plates 535 may be angled to allow working ends of the hydraulic cylinders 705 to ride more easily over the push plates 535.

The hydraulic cylinders 705 each include two inlets denoted 715 and 720 respectively. Inlet 715, labeled "IN" is used to retract the cylinder, while inlet 720, labeled "OUT" is used to extend the cylinder. The outlet of the pump 710 is connected by line 725 to a directional valve 730 having two outlets. A first one of the outlets on the directional valve 730 is connected by line 735 to a first inlet 715 on a first one of the cylinders 705 and to a second inlet 720 on a second one of the cylinders 705. A second one of the outlets on the directional valve 730 is connected by line 740 to the first inlet 715 on the second cylinder 705 and to the second inlet 720 on the first cylinder 705. Thus, in each drive cycle, one of the cylinders 705 will extend to rotate the platform 525 while the other retracts.

Figure 14:
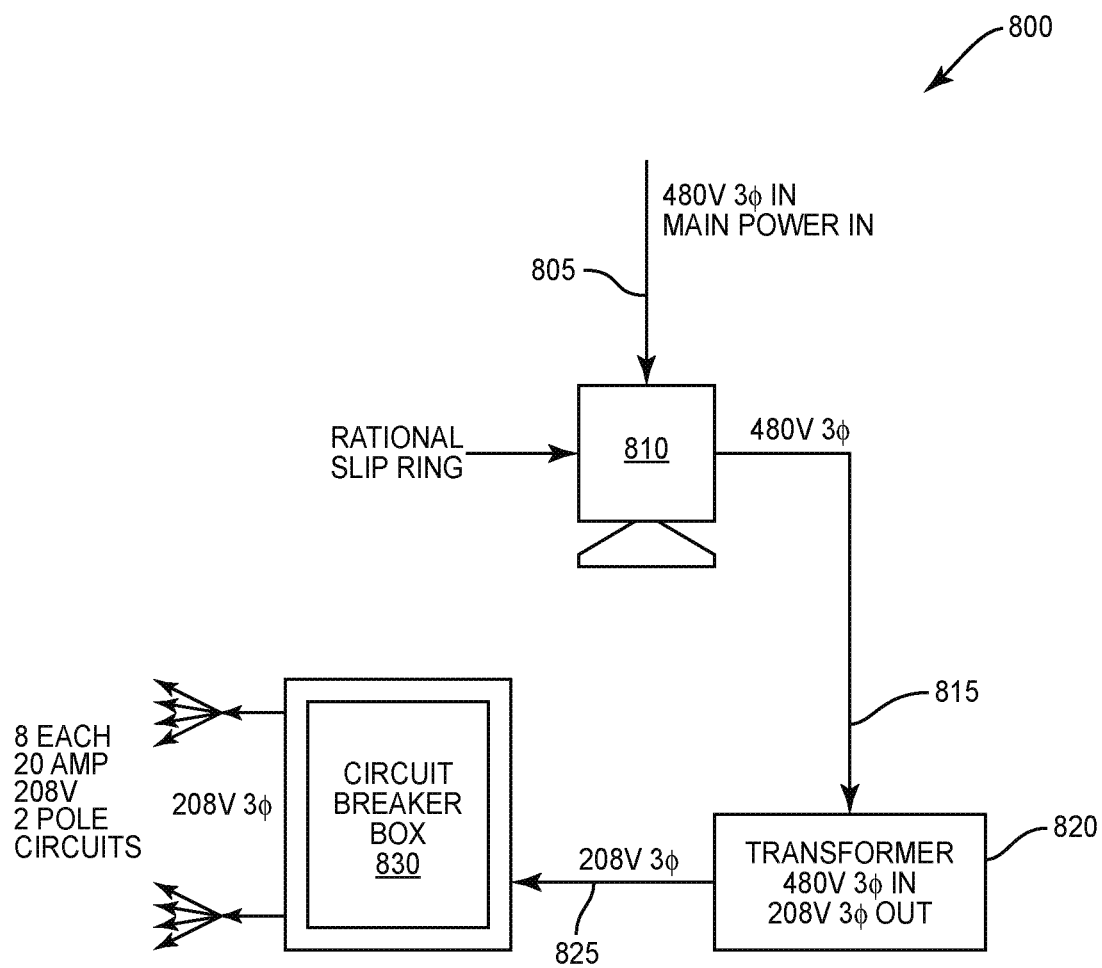
FIG. 14 illustrates an exemplary electrical system for supplying power to the molding machines on the carousel.

FIG. 14 illustrates an exemplary electrical system 800 for supplying power to the molding machines 505 on the carousel 520. The main power line 805 connects to a slip ring 810 mounted on the utility column 540. A transformer 820 is electrically connected by line 815 to the slip ring 810. In one embodiment, the main power line 805 supplies a 480 volt, 30 amp current to the transformer 820. The transformer 820 is connected by line 825 to a circuit breaker box 830. The transformer 820 steps the voltage down to 280 Volts, which is distributed by a circuit breaker box 830 to the molding machines 505. In one embodiment, the circuit breaker box 830 supplies a 208 volt, 20 amp current to each of the molding machines 505.

The pouring station 550 comprises a raised platform 555 on one side of the carousel 520. Stairs 560 are provided at one or both ends of the raised platform 555. The height of the platform 555 for the pouring station 550 is above the level of the rotating platform 525 of the carousel 520. Supply tanks 565 are disposed adjacent the raised platform 555 and contain the molding material used for making columns. A non-powered roller conveyor 580 extends from a point adjacent the supply tanks towards the central axis of the carousel 520 and projects over the rotating platform 525. The molding material is discharged from one of the supply tanks via a discharge outlet 570 into a bucket 585 or other receptacle, which is then moved along the conveyor to the end projecting over the rotating platform 525 where the molding material is dumped into a mold 510 in one of the molding machines 505.

The unloading station 600 is disposed adjacent the carousel 520 generally opposite the pouring station 550. The unloading station 600 comprises a generally arcuate staging platform 610 extending around the portion of the circular carousel 520. The staging platform 610 is typically higher that the rotating platform 525 of the carousel 520. Extraction equipment 620 may be disposed at one end of the staging platform 610 for extracting the molded columns from the molds 510. Once the columns are extracted from the molds 510, the molds 510 are placed in a staging area 615 of the staging platform 610. After allowing sufficient time for the molds 510 to cool, the molds are inserted back into the molding machine 505.

In one exemplary embodiment, the extraction equipment 620 comprises the extraction equipment 100 as shown in FIG. 7 and described in the accompanying text. More generally, the extraction equipment 620 may be any type of extraction equipment that is designed to facilitate removal of the molded columns from the molds 510. The particular type of the extraction equipment is not a material aspect of the production line. Thus, different types of extraction equipment 620 will be required for different types of molds.

During operation, workers at the pouring station 550 discharge molding material from the supply tanks 565 into buckets 585 and move the bucket 585 to the end of the conveyor 580 extending over the carousel 520 where the molding material is poured into the molds 510 as the molding machines 505 are conveyed past the pouring station 550. The molding machines 505 are then conveyed from the pouring station 550 to the unloading station 600. During this time period, the molding machines 505 are activated to rotate the molds 510. At the unloading station 600, the molding machines 505 are deactivated. Workers at the unloading station 600 unload the molds 510 from the molding machines 505 as the molding machines 505 are conveyed past the unloading station 600. In one exemplary embodiment, the molded columns are extracted from the mold 510 using the extraction equipment 620. The empty mold is then placed on the staging platform 610. After allowing sufficient time for the mold 510 to cool, the mold 510 is re-inserted into the molding machine 505 before the molding machine 505 reaches the pouring station 550.

What is claimed is:

1. A production line for manufacturing molded columns, said production line comprising:
   a plurality of molding machines, each molding machine being configured to receive a mold for a column;
   a carousel configured to convey the molding machines along a closed path; wherein the carousel comprises a rotating platform configured to rotate about a central axis;
   a pouring station disposed adjacent the closed path for supplying molding material to the molds in the molding machines as the molding machines are conveyed past the pouring station by the carousel; and
   an unloading station disposed adjacent the closed path for unloading the molds from the molding machines as the molding machines are conveyed past the unloading station by the carousel.

2. The production line of claim 1, wherein the molding machines are circumferentially spaced on the rotating platform about the central axis and are conveyed in a circular path.

3. The production line according to claim 2 further comprising a utility column extending upwardly through a central opening in the rotating platform for providing electrical service to the molding machines.

4. The production line according to claim 3 wherein the molding machines are connected via a slip ring to the electrical service in the utility column.

5. The production line of claim 1 wherein the pouring station comprises:
   a raised platform generally level with the carousel; and
   one or more supply tanks for supplying the molding material.

6. The production line of claim 1 wherein the unloading station comprises a staging platform for temporarily storing molds removed from the molding machines.

7. The production line of claim 1 wherein the unloading station further comprises extraction equipment for extracting columns from the molds.

8. A production line for manufacturing molded columns, said production line comprising:
   a plurality of molding machines, each molding machine being configured to receive a mold for a column;
   a conveyor configured to convey the molding machines along a closed path;
   a pouring station disposed adjacent the closed path for supplying molding material to the molds in the molding machines as the molding machines are conveyed past the pouring station by the conveyor;
   an unloading station disposed adjacent the closed path for unloading the molds from the molding machines as the molding machines are conveyed past the unloading station by the conveyor;
   wherein each molding machine comprises:
      a support frame; and
      a mold housing rotatably mounted to the support frame and configured to hold a corresponding mold.

9. The production line of claim 8 wherein the pouring station comprises:
   a raised platform generally level with the conveyor; and
   one or more supply tanks for supplying the molding material.

10. The production line of claim 8 wherein the unloading station comprises a staging platform generally level with the conveyor for temporarily storing molds removed from the molding machines.

11. The production line of claim 8 wherein the unloading station further comprises extraction equipment for extracting columns from the molds.

12. The production line of claim 8, wherein each molding machine further comprises a drive motor operatively coupled to the mold housing to supply rotational force to the mold housing to cause the mold housing to rotate relative to the support frame.

13. The production line of claim 8, wherein the conveyor simultaneously supports two or more molding machines, each of the two or more molding machines having a respective mold disposed in a respective rotatable mold housing.

14. The production line of claim 8, wherein the mold housings are configured to, while being conveyed by the conveyor, enclose a corresponding single piece mold.

15. A production line for manufacturing molded columns, the production line comprising:
- a conveyor;
- two or more molding machines simultaneously supported by the conveyor in spaced relation to each other, each molding machine configured to receive a mold for a column and comprising:
  - a support frame disposed on the conveyor; and
  - a mold housing rotatably mounted to support the frame and configured to hold a corresponding mold; and
  - a drive motor operatively coupled to the mold housing to supply rotational force to the mold housing to cause the mold housing to rotate relative to the support frame;
- wherein the conveyor is configured to simultaneously convey the plurality of molding machines along a closed path, the closed path routing past a pouring station and an unloading station;
- wherein the pouring station is disposed adjacent the closed path; the pouring station adapted for supplying molding material to the molds in the molding machines as the molding machines are conveyed past the pouring station by the conveyor;
- wherein the unloading station is disposed adjacent the closed path in spaced relation to the pouring station; the unloading station adapted for unloading molds from the molding machines as the molding machines are conveyed past the unloading station by the conveyor;
- wherein the unloading station comprises extraction equipment, the extraction equipment adapted for extracting a molded column from a corresponding mold; and
- wherein the conveyor is configured to operate in incremental fashion.

16. The production line of claim 15, wherein the conveyor comprises a rotating platform configured to rotate about a central axis.

17. A method of manufacturing a molded column, the method comprising:
- conveying two or more molding machines along a closed path while the molding machines are simultaneously supported by a conveyor in spaced relation to each other; the closed path routing past a filling station and an unloading station;
- adding molding material to a first mold at the filling station;
- conveying the first mold with the molding material therein toward the unloading station while the first mold is disposed in a mold housing of a first molding machine of the two or more molding machines;
- rotating the mold housing, with the first mold therein, while the first molding machine is on the closed path between the filling station and the unloading station;
- curing, during the rotating, the molding material in the first mold to form a first molded column;
- thereafter, removing the first mold from the first molding machine at the unloading station; and
- thereafter:
  - removing the first molded column from the first mold; and
  - returning the first molding machine to the filling station along the closed path via the conveyor, without removing the first molding machine from the conveyor.

18. The method of claim 17, wherein the method further comprises, without removing the first molding machine from the conveyor, subsequently:
- adding further molding material to the first mold or a second mold at the filling station;
- conveying the first or second mold toward the unloading station while the first or second mold is disposed in the mold housing of the first molding machine;
- rotating the mold housing while the first molding machine is on the closed path between the filling station and the unloading station, with the first or second mold therein with the further molding material;
- curing, during the rotating, the further molding material in the first or second mold to form a second molded column;
- thereafter, removing the first or second mold from the first molding machine at the unloading station; and
- thereafter:
  - removing the second molded column from the first or second mold; and
  - returning the first molding machine to the filling station along the closed path via the conveyor.

* * * * *